June 15, 1937. A. COHEN Re. 20,414

DOLL

Original Filed Feb. 24, 1936 2 Sheets-Sheet 1

Adolph Cohen
INVENTOR

BY Frank C. Parker
ATTORNEY

June 15, 1937. A. COHEN Re. 20,414

DOLL

Original Filed Feb. 24, 1936 2 Sheets-Sheet 2

Adolph Cohen
INVENTOR
BY Paul O. Parker
ATTORNEY

Reissued June 15, 1937

Re. 20,414

UNITED STATES PATENT OFFICE 20,414

DOLL

Adolph Cohen, Brooklyn, N. Y.

Original No. 2,040,201, dated May 12, 1936, Serial No. 65,467, February 24, 1936. Application for reissue January 11, 1937, Serial No. 120,133

7 Claims. (Cl. 46—141)

The invention relates to dolls and more especially to animated dolls of the diaper-wetting type.

The primary object of the invention is the provision of a doll of this character, wherein through the instrumentality of a conduit internally of the body of such doll when liquid is introduced into the mouth of the latter it will flow through the conduit and discharge from between the legs and thus wetting a diaper while worn by said doll, thus imitating the habit of a living infant.

Another object of the invention is the provision of a doll of this character, wherein an absorbent element which is compressible will enable a certain amount of the liquid to be held within the body of the doll so that by pressing upon the body periodical wettings may be effected, thus teaching a child nature's habits with respect to infants in this manner having such child versed in nursery for the care and dressing of an infant.

A further object of the invention is the provision of a doll of this character, wherein the body make-up is novel in construction so that such doll will be imitative of one of nature's calls in infants, namely, the wetting of a diaper, and devoid of damage to the doll as said body will not become saturated with water when introduced through the mouth of said doll or while retained interiorly of the body and also the latter will not become contaminated with any obnoxious odor or smell.

A still further object of the invention is the provision of a doll of this character, wherein the entire assembly of the body of the doll is novel and unique, so as to increase the durability of the same and serving to encourage motherly instinct to a child possessing the doll.

A still further object of the invention is the provision of a doll of this character, which is simple in its construction, thoroughly reliable and effective in the operation thereof, strong, attractive in appearance, imitative of a living infant, requiring attention as that of a nurse, and inexpensive to manufacture.

With these and other objects in view the invention consists in the features of construction, combination and arrangement of parts as will be hereinafter, more fully described, illustrated in the accompanying drawings which disclose the preferred embodiment of the invention and pointed out in the claims hereunto appended.

In the accompanying drawings.

Similar reference characters indicate corresponding parts throughout the several views in the drawings.

Figure 3:
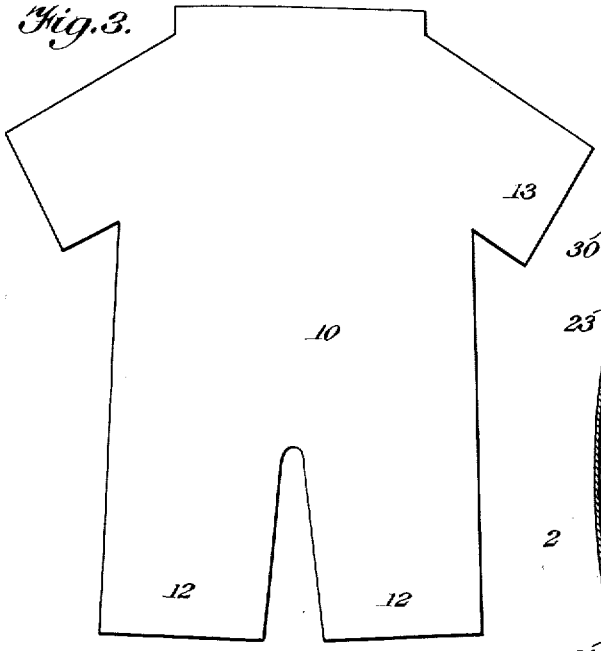
Figure 3 is a plan view of one of the complemental body covering sections of the doll.
Figure 4:
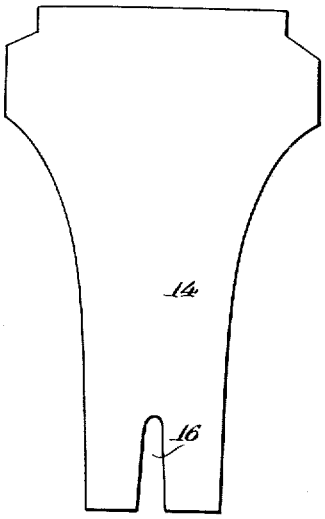
Figure 4 is a plan view of one of the complemental liquid conduit sections.
Figure 1:
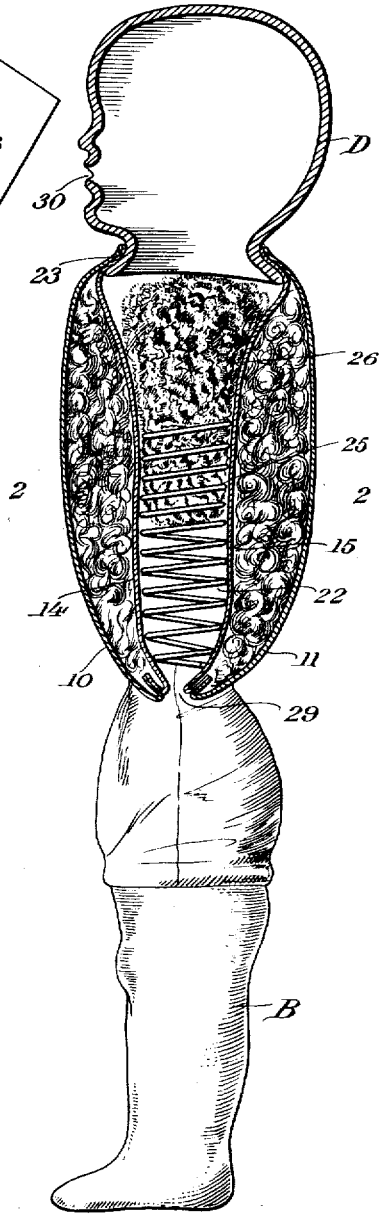
Figure 1 is a vertical transverse sectional view through a doll constructed in accordance with the invention.

Referring to the drawings in detail A designates generally the body of the doll, B the legs, C the arms and D the head respectively, of such doll. The arms C and the head D are preferably made from a composition of solid hard material, although hollow in formation and molded or cast in the conventional manner. Likewise the lower portions of the legs B with the integral feet are preferably made from a composition similar to the arms and head and of hollow formation.

Figure 5:
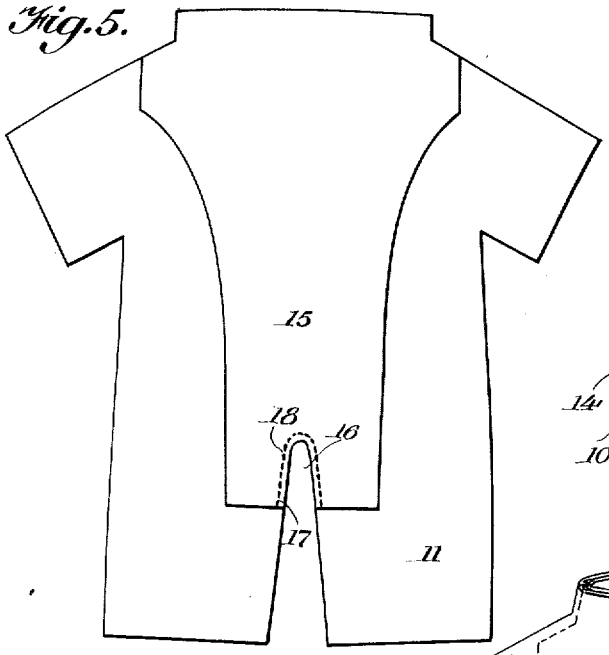
Figure 5 is a plan view showing the first step in the method of joining one body covering and one liquid conduit section together.
Figure 2:
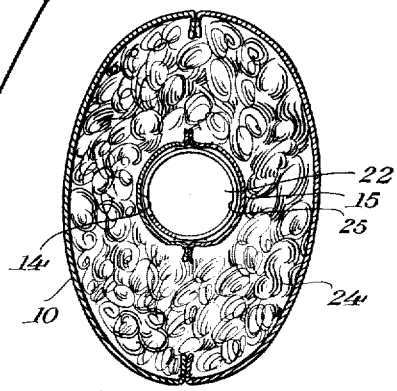
Figure 2 is a sectional view on the line 2—2 of Figure 1.
Figure 6:
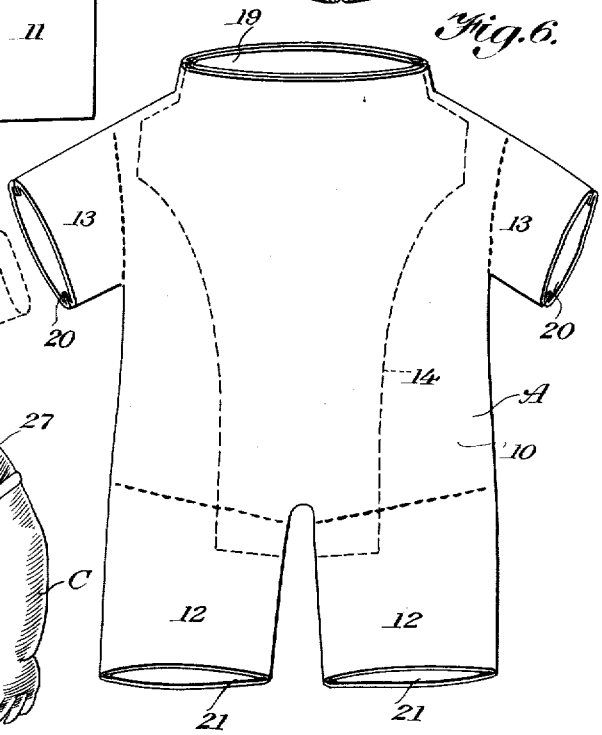
Figure 6 is a perspective view showing the body of the doll completed with the sections intact.
Figure 7:
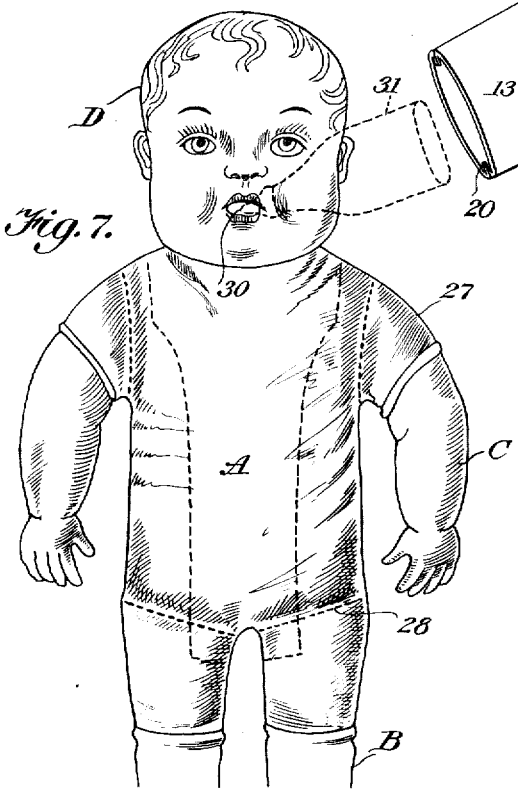
Figure 7 is a perspective view of the complete doll.

The body A of the doll includes similarly patterned complemental body covering sections 10 and 11, respectively, preferably made from waterproofed or sized flexible fabric, although the same may be made from any suitable material, and these sections are cut to provide leg extensions 12 and arm extensions 13, respectively. Between these sections 10 and 11 are arranged complemental liquid conduit sections 14 and 15, respectively, which are similarly patterned and have the central bifurcations 16 in their lower ends for registering at the crotch between the leg extensions 12 of the sections 10 and 11. The bordering edges 17 to the bifurcations 16 are first attached at the crotch between the extensions 12 by a line of stitches 18 to the respective sections 10 and 11 when the body A of the doll is being assembled as is shown in Figure 5 of the drawings. Thereafter the sections 10 and 11 are laid one upon the other with the sections 14 and 15 outside the same, and the sections 10 and 11 are marginally joined with each other by suitable stitches, excepting there remain the neck opening 19, the arm and leg extension openings 20 and 21 respectively, and an opening 29 at the apex of the crotch. Whereupon the stitched sections 10 and 11 are turned inside out placing the seams interiorly of the body A and by pulling the sections 14 and 15 through the neck opening 19 the marginal side edges of said sections can be joined together by stitches or otherwise to provide a downwardly tapered conduit or funnel 22 from the neck opening 19 to the crotch between the leg extensions 12. The flanged neck portion 23 of the head D is inserted through the neck opening 19 after the conduit or funnel is redrawn into the body A and such portion telescoped into the upper open end of said conduit or funnel 23. The neck opening edge and the edge of the upper open end of the conduit or funnel are joined together and firmly secured exteriorly about the neck portion 23 of the head D for the joining of the body A therewith.

A filling of compressible material, such as loose cotton, wool or any other material is packed within the body A between the covering sections 10 and 11 and the funnel or conduit 23 to give the necessary or required shape to said body, the material being indicated at 24.

Within the conduit or funnel 23 is a helical spring 25 which prevents the collapsing of such conduit or funnel, and also the latter contains a sponge 26, although it may be any liquid absorbing substance to become saturated with a quantity of liquid flowing into the said conduit or funnel, the sponge 26 being partly pocketed by and above the spring 25.

The legs B and the arms C are fitted within the openings 20 and 21 and fastened therein in any suitable manner.

At the shoulders of the body A are stitches 27, these being carried through the sections 10 and 11 and are the hinge points for the arm extensions, while below the hip areas of said body are stitches 28 which are carried through the sections 10 and 11 and the sections 14 and 15, respectively, these stitches being extended to the crotch between the leg extensions 12 to provide a liquid discharge 29 only at the crest of the said crotch leading directly from the conduit or funnel 23.

The head D is provided with an open mouth 30 so that liquid held in a dispenser 31 can be readily introduced through this mouth into the conduit or funnel, whence the liquid will flow therein and discharge from the discharge opening 29 causing a wetting of a diaper (not shown) being worn by the doll. A quantity of the liquid will be absorbed by the sponge 26 on admission of the said liquid to the conduit or funnel and for periodical wetting it is necessary to press upon the body A of the doll so that said liquid in the sponge will be freed therefrom and delivered through the discharge opening 29. The wetting by the doll is imitative of an infant in conformity with the habit of a human of tender age.

The sections 14 and 15 are formed from a waterproof material, such as rubberized or sized flexible fabric or the material similar to the sections 10 and 11, although any suitable kind may be employed.

The joining of the sections 10 and 11 at the crotch between the leg extensions 12 is such as to avoid any obstruction to the opening 29 in the crest of the said crotch.

What is claimed is:

1. In a doll, a head having an open mouth, a body formed from joined companion liquid resisting flexible sections, a funnel interiorly of the body formed from joined companion liquid resisting flexible sections and constituting a direct liquid lead from the head to a point of external discharge at a leg crotch in said body, means within the funnel to maintain it against collapsing, and a liquid absorber within the funnel and emitting liquid absorbed thereby on compressing the body, the funnel being tacked to the body sections at the end thereof next to the head and to opposite sides of the leg crotch with respect to the point of the liquid discharge.

2. In a doll, a head having a mouth, a body formed of joined companion liquid-resisting flexible sections, a funnel interiorly of said body and constituting a direct liquid lead from the head to a point of external discharge at a leg crotch in said body, means within said funnel to maintain it against collapsing, and said funnel being tacked to the body sections at the end thereof next to the head and to opposite sides of the leg crotch with respect to the point of liquid discharge.

3. In a doll, two body sections and two funnel sections interiorly of said body sections, said sections being composed of flexible material, means securing a funnel section to a body section adjacent the lower ends of said sections, means securing a second funnel section to a second body section adjacent the lower ends of said second sections, seam means securing all of said sections together adjacent the lower ends, said seam means being inwardly turned to lie between a funnel and a body section, thereof except at the center of said lower ends, means joining the sides of said body sections to each other, means joining the sides of said funnel sections to each other, packing means between said body sections and said funnel sections, and means joining the upper ends of said funnel sections to the upper ends of said body sections.

4. The method of forming a body for a doll of the type described which comprises forming two body sections, forming two funnel sections of less size than said body sections, placing a funnel section upon a body section with its lower edge coincident with the lower edge of said body section, securing said sections together adjacent said lower edge, securing the second body and funnel sections in a similar manner, superimposing the units so formed upon one another with the lower edges thereof coincident, securing said units together adjacent said lower edges with means extending from the ends of said edges to points spaced from the center of said edges, securing the side edges of said body sections to each other, securing the side edges of said funnel sections to each other, inserting packing between said body and funnel sections, and securing the upper edges of said funnel sections to the upper edges of said body sections.

5. In a doll, a head having a mouth, a body formed of two body sections of flexible material, a funnel interiorly of said body formed of two sections of flexible waterproof material, means securing a first funnel section to a body section at the lower end of said funnel section, seam means securing said body sections and said lower ends of said funnel sections together except at the center of said lower ends of said funnel sections, said seam means being disposed inwardly of said body, means joining the sides of said body sections to each other, means joining the sides of said funnel sections to each other, packing means between said body sections and said funnel sections, and means joining said body and funnel sections to said head.

6. In a doll, a head having a mouth, a body, a funnel interiorly of said body, said body being composed of flexible liquid resisting sections, each section having rebent edge portions adjacent a crotch portion of said body and rebent portions adjacent the sides of said sections, said funnel being composed of flexible liquid resisting sections, each funnel section having a rebent edge adjacent the crotch portion of said body, said rebent edges of said sections adjacent said crotch being secured to form seams lying between a funnel and a body section, said rebent side edges of said body sections being joined to form seams lying inwardly of said body, means securing the side edges of said funnel sections together, packing material between said funnel and said body, said funnel being an unobstructed waterproof channel through said body and said rebent edges adjacent said crotch, and said body and funnel sections being secured to said head.

7. A doll, comprising a body formed of an outer wall of flexible material and an inner funnel member of flexible waterproof material, said outer wall having an opening at the top and an opening near the bottom, means securing the funnel member to the outer wall adjacent said second opening, packing material between the outer wall and funnel member, a head having an opening therein, and means for securing the upper portions of said outer wall and funnel member to said head with the opening in the head communicating with said upper opening of the body, said opening near the bottom being substantially centered on the axis of said funnel member.

ADOLPH COHEN.

CERTIFICATE OF CORRECTION.

Reissue No. 20,414. June 15, 1937.

ADOLPH COHEN.

It is hereby certified that error appears in the printed specification of the above numbered patent requiring correction as follows: Page 2, second column, lines 29 to 31 inclusive, claim 3, strike out ", said seam means being inwardly turned to lie between a funnel and a body section."; and before "means" in line 32, same claim, insert the words and comma said seam means being inwardly turned to lie between a funnel and a body section,; and that the said Letters Patent should be read with these corrections therein that the same may conform to the record of the case in the Patent Office.

Signed and sealed this 5th day of October, A. D. 1937.

Henry Van Arsdale

Seal) Acting Commissioner of Patents.